May 22, 1951 C. H. BEARE 2,554,356
CONTINUOUS METHOD OF CURING RUBBER STRIPS
Filed April 8, 1949 2 Sheets-Sheet 1

INVENTOR
CHARLES H. BEARE
BY
*Spencer Hardman & Fehr*
HIS ATTORNEYS

May 22, 1951 C. H. BEARE 2,554,356
CONTINUOUS METHOD OF CURING RUBBER STRIPS
Filed April 8, 1949 2 Sheets-Sheet 2

INVENTOR
CHARLES H. BEARE
BY Spencer Hardman + Fehr
HIS ATTORNEYS

Patented May 22, 1951

2,554,356

UNITED STATES PATENT OFFICE 2,554,356

CONTINUOUS METHOD OF CURING RUBBER STRIPS

Charles H. Beare, Dayton, Ohio, assignor to General Motors Corporation, Detroit, Mich., a corporation of Delaware Application April 8, 1949, Serial No. 86,151

9 Claims. (Cl. 18—53)

This invention relates to a method of curing under applied heat a long strip of vulcanizable rubber compound or other material which can be heat-cured by this method. A long strip of vulcanizable rubber compound can be readily produced, in continuous length if so desired, by extruding the compound thru a suitable extrusion die so designed as to give the strip the desired cross sectional shape. Such an uncured strip emerges from the extruding die in a flexible pliant condition and usually heated to some extent.

By the method of this invention such a continuously advancing uncured strip is passed endwise into a longitudinally slotted flexible casing thru the opened slot therein while said casing is travelling forward at the same speed of travel as the advancing strip. Heated finely divided material which is not adversely affected by the temperature to which it must be heated is passed into the flexible casing so as to embed the strip in said hot powdered material and supply a curing heat thereto and also substantially exclude atmospheric air therefrom while said strip travels forward within the flexible casing for a sufficient length of time for the applied heat to cure the strip to the desired extent. As an illustration, if the strip advances from the extruding machine at a speed of 40 feet per minute then the flexible casing should also travel at this speed, so in order to give a five-minute cure to the strip it remains embedded in the hot powder in the casing while said casing travels a distance of 200 feet at the speed of 40 feet per minute. The longitudinal slot in the flexible casing is flexed open by any suitable means at the end of said 400 feet of travel and the cured strip passes from the casing thru the opened slot therein as both the strip and casing continue their forward travel. The heating powdered material it at least to a large extent emptied from the casing when the longitudinal slot therein is opened and the cured strip passes therefrom. Of course the casing should be sufficiently long to give the necessary time period for the desired degree of cure.

Preferably the flexible casing is in the form of an endless conveyor which passes around suitable pulleys, sheaves or rollers back to the starting point where the longitudinal slot therein is flexed open to permit the entrance thereinto of the continuously advancing uncured strip and heated powder as mentioned above. The endless flexible conveyor is driven by suitable drive pulleys at the same rate of longitudinal travel as that of the strip emerging from the extruding machine. The heating powdered material after being emptied from the flexible casing may be used again and again by passing said powdered material thru a suitable heater and re-heating it to the desired temperature at which it was originally passed into the flexible casing. Thus the curing process may be continuous so long as the strip to be cured is supplied thereto in continuous length.

The various advantageous features of the method of this invention will be clear from the above general description.

In the drawings.

Similar reference characters refer to similar parts thruout the drawings.

Figure 3:
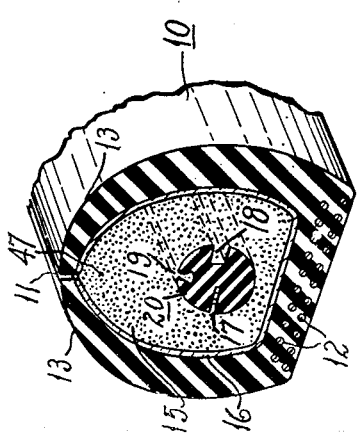
Fig. 3 illustrates in enlarged perspective and section the flexible casing with the strip being cured embedded in the hot powdered material therein.

10 designates the flexible casing which has a continuous longitudinal slot 11 therein as best shown in Fig. 3. Flexible casing 10 may be of rubberized fabric with longitudinally extending flexible wires or fabric cords 12 therein to provide the desired tensile strength thereto, all after the manner of conveyor belting as now well known in that art. The flexible lips 13 of casing 10 are so designed as to normally remain substantially closed as shown in Fig. 3 but capable of being readily flexed laterally outwardly by any suitable means so as to open up the longitudinal slot 11 sufficiently to permit strip 20 to pass therethru both when said strip enters said flexible casing and when it emerges therefrom. Preferably the tubular interior space 15 of casing 10 has an interior lining 16 of asbestos fabric or other poor heat-conducting material in order to greatly reduce conduction of heat thru the casing walls. This not only greatly aids in maintaining the temperature of the hot powder within space 15 but also serves to protect the main flexible walls of casing 10 from excessive temperatures and so prolongs the useful life of the casing.

Of course it is contemplated that the flexible casing 10 may be made otherwise than described above so long as it functions properly with the method of this invention. For instance, casing 10 may be made of flexible metal, cotton or asbestos textile fabric, rubberized textile fabric of asbestos or cotton, or any combination of these materials that can withstand the temperatures used therewith. Casing 10 may be first made in the form of a tubular hose and then cut to provide the longitudinal slot 11 therein.

Figure 1:
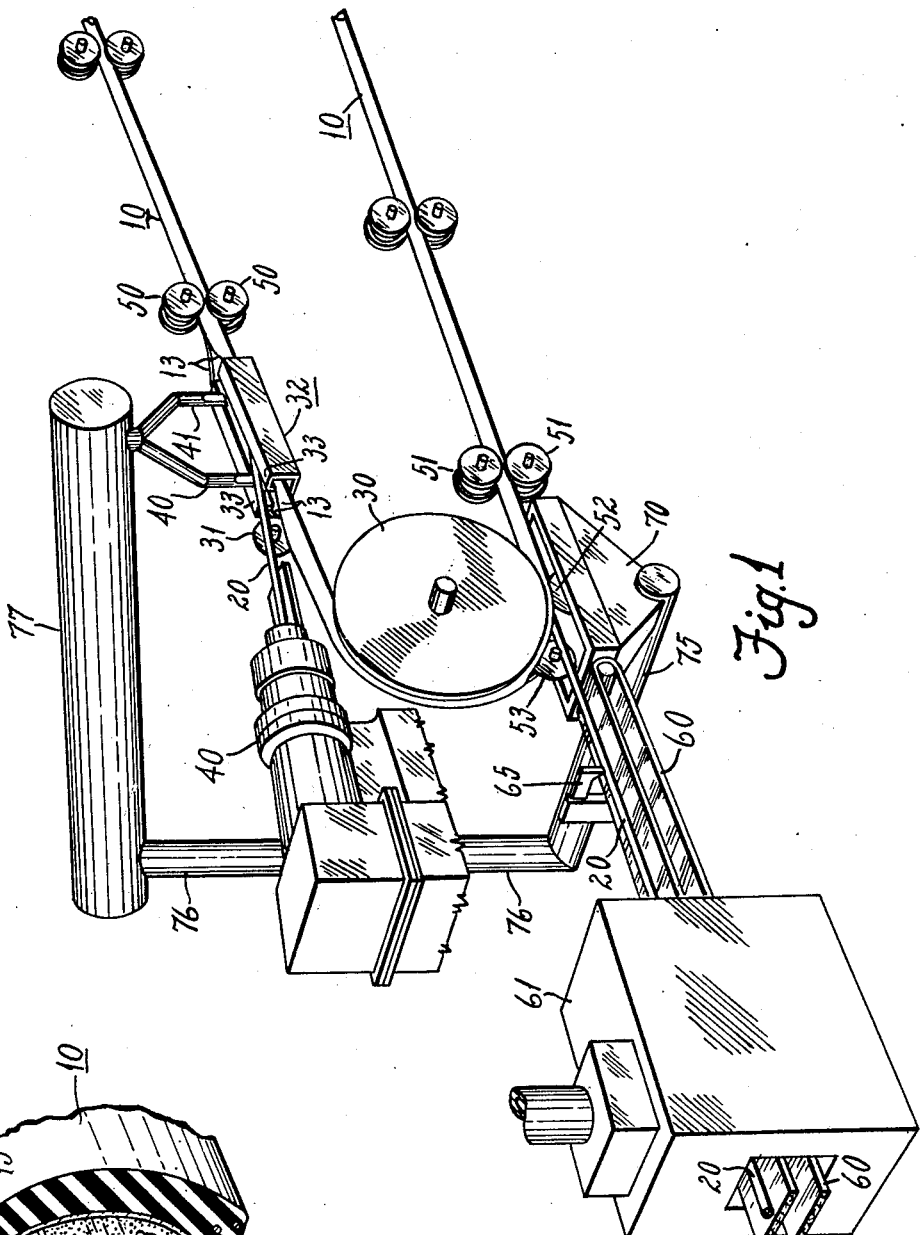
Fig. 1 is a diagrammatic perspective view of the main portion of the apparatus for carrying out the method of this invention. The flexible casing conveyor is shown broken away at the right of Fig. 1, since it extends beyond this figure a distance of the order of 100 feet or more.

In Fig. 1, flexible casing 10 is shown passing around the rotating grooved pulley 30 of such large diameter that said casing will pass around the curvature thereof without undue buckling or collapsing. This pulley 30 may be power driven to serves as a driving means for the long flexible casing 10, or it may be an idler pulley rotated by the longitudinal movement of the casing which may be driven by any other suitable means. Shortly, after casing 10 passes around pulley 30 its longitudinal slot 11 is initially spread open by the rotating spreader wheel 31 mounted in the path of said casing 10, as shown in Fig. 1. Spreader wheel 31 is thin at its periphery and increases in thickness toward its center to give the desired spreading action on the flexible lips 13. A stationary guide member 32 is provided with two opposed guiding flanges 33 spaced apart and so positioned and arranged as to engage the inside surfaces of the separated lips 13 of casing 10 and hold said lips 13 spread apart sufficiently to permit the longitudinally advancing strip 20 to pass between said flanges 33 into the interior space 15 of casing 10. Since the guide member 32 is stationary lips 13 of casing 10 slide along the two guide flanges 33, hence said flanges 33 should be shaped to provide a smooth easy spreading action on the longitudinally travelling lips 13 of the casing with as little friction as possible and only for the short distance required.

Figure 2:
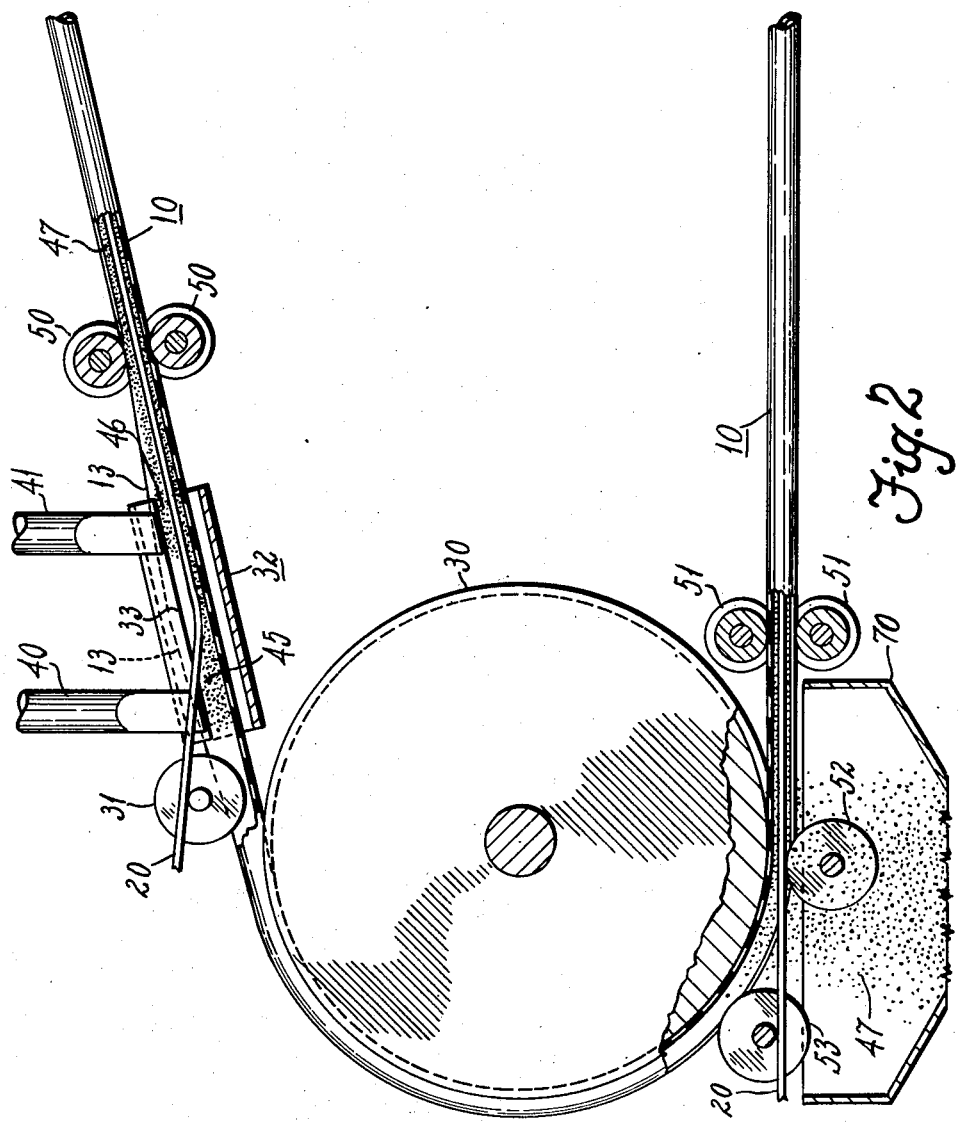
Fig. 2 is an enlarged diagrammatic side view of parts shown in perspective in Fig. 1, and shows how the strip is embedded in the heated powder material as it enters the flexible casing.

An extruding machine 40 is shown in Fig. 1 positioned so that the extruded pliant strip 20 emerges therefrom and passes above or to one side of the spreader wheel 31 directly between the lip-spreading guide flanges 33 into the interior space 15 of casing 10. Hot powdered material is continuously passed into interior space 15 so as to both underlie and overlie the entering strip 20 within casing 10 and completely embed said strip in the hot powdered material. In Fig. 2 of the drawings, the down spouts 40 and 41 are arranged to deliver the hot powder into space 15 below and above the strip 20 respectively. Down spout 40 preferably extends down between the opposed guide flanges 33 on the stationary guide 32 in such location as to deliver a layer 45 of hot powder underneath strip 20. The entering strip 20 is thus supported upon this lower layer 45 and held spaced thereby out of contact with the lower walls of casing 10. The second down spout 41 then delivers hot powder over the top and around the sides of strip 20, as shown at 46, to fill the interior space 15 of casing 10 and completely embed the strip 20 in the hot powder. As casing 10 then passes from the slot-opening guide 32 the outwardly flexed lips 13 thereof tend to return to their normal shape and close inwardly over the hot powder within casing 10. Preferably shortly after leaving guide 32 casing 10 passes between two grooved guide sheaves 50 so arranged as to completely close casing 10 and in so doing to compact the hot powdered material 47 in close firm contact with the strip 20 and thereby provide good heating contact. Fexible casing 10 together with its contents then travels thru suitable supporting and guiding sheeves or wheels spaced at suitable locations along its distance of travel until the strip 20 is cured for the desired time period under the applied heat from the powdered material. The length of the distance of travel for curing in any installation should be equal to the product of the rate of travel in feet per minute times the number of minutes necessary to give the desired degree of cure of strip 20. For instance, a 200 ft. length of travel of casing 10 will give a 5 minute cure if the speed of travel of strip 20 and casing 10 is 40 ft. per minute, or give a 10 minute cure if the speed of travel is only 20 feet per minute.

At the end of the length of travel the lips 13 of casing 10 may be again held flexed apart by any suitable means and the cured strip 20 permitted to pass out of casing 10 while both the strip and casing continue to travel at the same speed. In the drawings, flexible casing 10 is an endless conveyor which returns to the lower side of the grooved pulley 30 shortly after passing thru the supporting grooved guide sheaves 51. Spreader wheels 52 and 53 are mounted in the path of casing 10 so as to enter slot 11 therein and spread lips 13 apart sufficiently for strip 20 to pass from the interior of said casing, as clearly shown in the lower part of Fig. 2. The powdered material 47 falls by gravity out of the opened slot 11, its removal being materially aided by the emergence of strip 20 from casing 10, as will be obvious. If necessary or desired, an air blast may be conveniently used to blow the powdered material out thru the opened slot 11. After casing 10 passes the last spreader wheel 53 it is preferably empty or nearly so as it passes on around grooved pulley 30 back to the initial point of its cycle.

The cured strip 20 after emerging from casing 10 may be supported by a suitable conveyor belt 60 which carries strip 20 on into washer 61. As strip 20 continuously passes thru washer 61 it is washed preferably by spraying with water to cool and set the cure of the strip and to clean off any powdered material thereon. From washer 61 strip 20 may pass on into a suitable automatic cut-off machine (not shown) where it is cut into the desired lengths.

The particular form of strip 20 illustrated in Fig. 3 is a flexible rubber weather-sealing strip like or similar to that disclosed in patent to Eichner No. 2,189,138, issued February 6, 1940. This illustrated strip 20 is extruded approximately to the cross section shown in Fig. 3 and has a series of longitudinal grooves 17, 18 and 19 therein. The quite narrow groove 17 is adapted to fit snugly about the inserted edge of a sheet metal panel and may have a width of only about one-sixteenth of an inch. The hot powdered material 47 should be such as to enter all the grooves 17, 18 and 19 to facilitate curing of the strip 20 and, particularly in the case of narrow width grooves such as 17, to prevent the lips of the grooves from contacting one another during the curing operation and sticking together. In order to positively separate the lips of narrow grooves, such as 17, and to aid in the removal of the powdered material therefrom a stationary metal blade 65 (Fig. 1) may be mounted adjacent the point where strip 20 emerges from casing 10 and so arranged as to slide along within the narrow groove 17 in strip 20 as said strip moves continuously past said blade 65. Of course similar suitably shaped stationary members may also, if so desired, be arranged to slide along in the larger groove 18 and/or 19 in order to strip the powdered material therefrom and to aid in guiding strip 20 in its proper path.

In the form of apparatus shown in Fig. 1 the powdered material 47 falls into tapered hopper 70, and is passed from the bottom portion of said hopper through a suitable heater for raising the temperature of the powdered material to that desired and thence is continuously fed to the two down spouts 40 and 41. In the diagrammatic showing in Fig. 1, 75 represents a screw conveyor to transfer the powder laterally, 76 represents a screw conveyor to transfer the powder vertically, and 77 represents a gas-fired heater for heating the powdered material to the desired temperature while it is being continuously fed thru heater 77 to the two down spouts 40 and 41. Obviously the means for collecting the powdered material from hopper 70 and passing it back to down spouts 40 and 41 thru a suitable heater may be any of well known practical means for performing such functions. The particular means for accomplishing such transfer and heating may be readily supplied without further invention by those skilled in that art.

The finely divided powder material useful with the method of this invention may be any which remains a stable dry powder under the temperatures used, does not cake under the conditions present, and remains substantially chemically non-reactive upon the strip 20 while in contact therewith. Illustrative examples are: air slaked lime, precipitated calcium carbonate, chalk, magnesium oxide and aluminum oxide.

While the embodiment of the present invention as herein disclosed, constitutes a preferred form, it is to be understood that other forms might be adopted.

What is claimed is as follows:

1. The steps in the method of curing uncured strips of material by applied heat, comprising: passing the strip to be cured endwise into a longitudinally slotted flexible casing by progressively spreading a sufficient portion of the casing slot to permit lateral entrance of said strip into said casing while said strip and casing are travelling forward at substantially the same speed, simultaneously passing powder material previously heated to the curing temperature into the flexible casing thru the slot therein so as to substantially embed said strip in the hot powder within the flexible casing, then maintaining the longitudinal slot in the flexible casing closed and thereby maintaining said strip embedded within the hot powder while said casing continues to travel forward until said strip has been cured to the desired extent, then removing the strip from said casing by opening the longitudinal slot therein.

2. The method of claim 1 wherein the hot powder is initially compacted upon the strip embedded therein by means of exterior rollers which compress said flexible casing inwardly thereupon.

3. The method of claim 1 wherein the layer of previously heated powder material around the embedded strip maintains said strip at a curing temperature until said strip is cured.

4. The method of claim 1 wherein the previously heated powder material is substantially non-reactive chemically upon the strip material.

5. The method of claim 1 wherein the previously heated powder material is aluminum oxide.

6. The method of claim 1 wherein the powder material is lime powder.

7. The steps in a continuous method of curing an uncured strip of material under applied heat, comprising: passing a continuously advancing uncured strip into a longitudinally slotted flexible casing thru the longitudinal slot therein by progressively spreading said slot over a relatively short length thereof sufficient to permit lateral entrance of said strip into said casing while the strip and casing are travelling longitudinally together, progressively filling said casing with previously heated powder material thru the longitudinal slot therein so as to substantially embed said strip within the heated powder within said casing, maintaining said casing substantially closed upon its contents as said casing and contents travel forward together until said strip is cured by heat derived from said previously heated powder, then progressively opening the slot in said casing and passing said strip progressively thru the opened slot from said casing while both said casing and strip continue to travel longitudinally.

8. The method of claim 7 wherein the heated powder material is passed into said travelling casing at spaced positions so that some of said heated powder underlies said strip and some of said heated powder overlies said strip as said strip progressively enters said casing.

9. The method of claim 7 wherein the longitudinally slotted flexible casing is an endless conveyor which travels continuously from the point where the cured strip continuously emerges therefrom back to the point where the uncured strip continuously enters said casing.

CHARLES H. BEARE.

REFERENCES CITED

The following references are of record in the file of this patent:

UNITED STATES PATENTS

| Number | Name | Date |
|---|---|---|
| 1,949,226 | Wallace | Feb. 27, 1934 |
| 2,323,191 | Bennett | June 29, 1943 |
| 2,463,288 | Leguillon | Mar. 1, 1949 |